United States Patent
Hiromi et al.

(10) Patent No.: US 11,972,051 B2
(45) Date of Patent: Apr. 30, 2024

(54) INFORMATION PROCESSING APPARATUS, INFORMATION PROCESSING SYSTEM, AND INFORMATION PROCESSING METHOD

(71) Applicant: DENSO TEN Limited, Kobe (JP)

(72) Inventors: Rei Hiromi, Kobe (JP); Shinichi Shiotsu, Kobe (JP); Yoshikuni Miki, Kobe (JP); Akio Arai, Kobe (JP); Yohei Kakee, Kobe (JP)

(73) Assignee: DENSO TEN Limited, Kobe (JP)

( * ) Notice: Subject to any disclaimer, the term of this patent is extended or adjusted under 35 U.S.C. 154(b) by 179 days.

(21) Appl. No.: 17/666,835

(22) Filed: Feb. 8, 2022

(65) Prior Publication Data

US 2023/0125250 A1 Apr. 27, 2023

(30) Foreign Application Priority Data

Oct. 27, 2021 (JP) .................. 2021-175611

(51) Int. Cl.
*G06F 3/01* (2006.01)
*G05B 13/02* (2006.01)
*G06F 3/16* (2006.01)

(52) U.S. Cl.
CPC ......... *G06F 3/016* (2013.01); *G05B 13/0265* (2013.01); *G06F 3/16* (2013.01)

(58) Field of Classification Search
None
See application file for complete search history.

(56) References Cited

U.S. PATENT DOCUMENTS

| 10,593,167 | B2* | 3/2020 | Gervais .................... G08B 6/00 |
| 10,996,757 | B2* | 5/2021 | Raghoebardajal ...... G06F 3/016 |
| 11,145,172 | B2 | 10/2021 | Nakagawa et al. |
| 11,754,845 | B2* | 9/2023 | Osterhout .......... G02B 27/0176 361/679.03 |
| 2015/0241973 | A1* | 8/2015 | Luden .................... G09G 5/006 345/156 |
| 2023/0039530 | A1* | 2/2023 | Resnick ............. G06V 10/7715 |
| 2023/0044961 | A1* | 2/2023 | Resnick ................. G06F 3/017 |

FOREIGN PATENT DOCUMENTS

JP 2007-324829 A 12/2007

\* cited by examiner

*Primary Examiner* — Paul W Huber
(74) *Attorney, Agent, or Firm* — Oliff PLC

(57) ABSTRACT

An information processing apparatus including a control unit that generates a vibration stimulation signal to be provided to a user based on a sound signal in a content, wherein the control unit is configured to: acquire data of a content including a sound signal; execute an analysis process on the sound signal; and generate a vibration stimulation signal to be provided to a user in a conversion process of the sound signal according to a result of the analysis process.

20 Claims, 15 Drawing Sheets

FIG.8 ACTUAL ENVIRONMENTAL SOUND

FIG.16
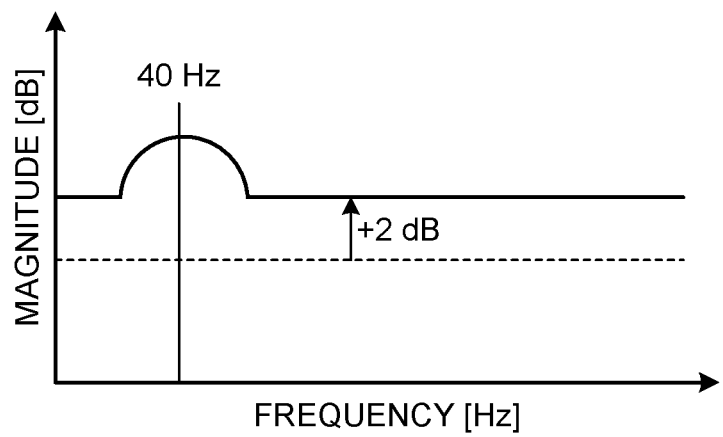
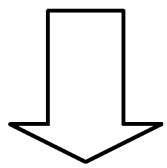
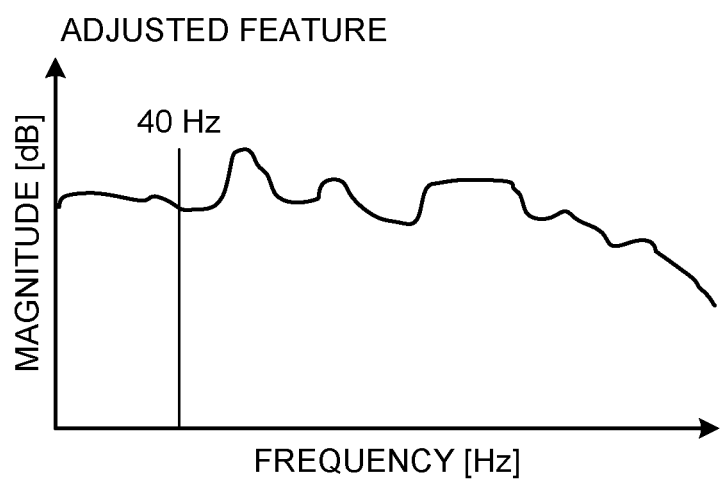
ADJUSTED FEATURE

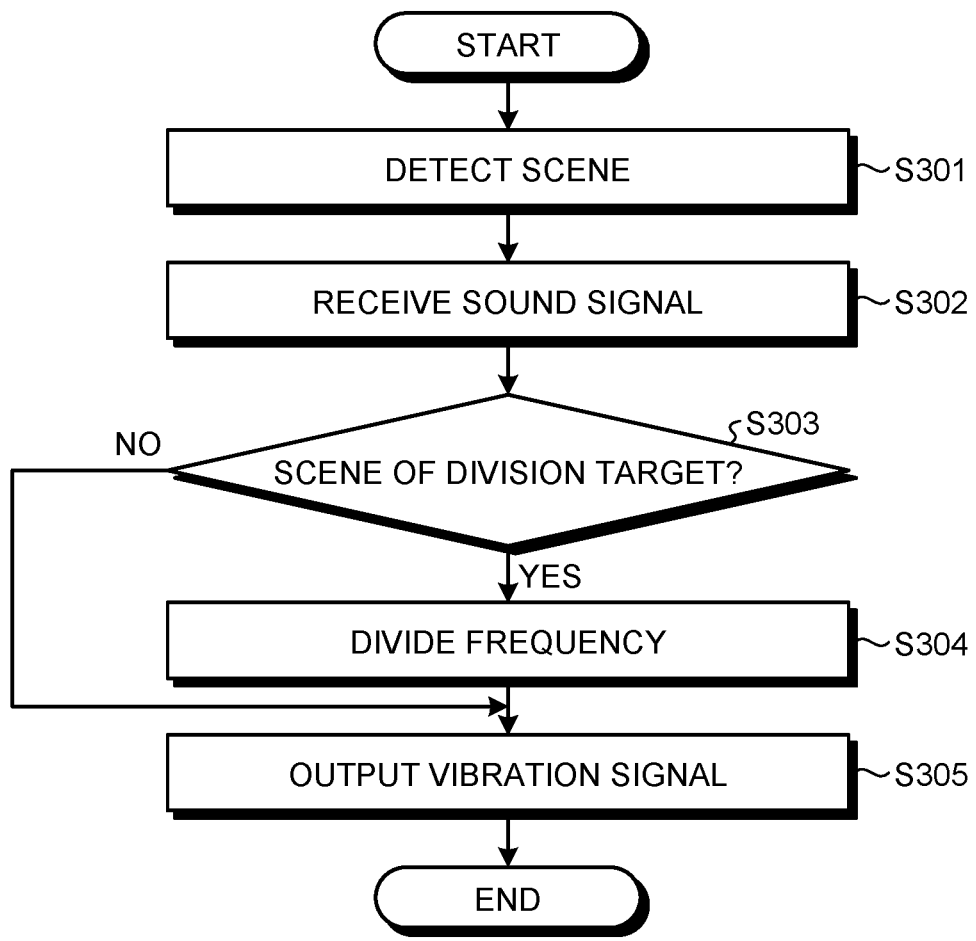

INFORMATION PROCESSING APPARATUS, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2021-175611, filed on Oct. 27, 2021, the entire contents of which are incorporated herein by reference.

FIELD

The embodiments discussed herein are directed to an information processing apparatus, an information processing system, and an information processing method.

BACKGROUND

Conventionally, there has been known a technology for providing to a user in a distant location, with the use of a Head Mounted Display (HMD) and the like, a Cross Reality (XR) content having a live-experience type, which includes images and sounds that are live-recorded at an event site and the like.

Note that XR is an expression that comprehensively indicates virtual-space technologies including Virtual Reality (VR), Augmented Reality (AR), Mixed Reality (MR), Substitutional Reality (SR), Audio/Visual (AV), etc.

Furthermore, there has been also known a technology for driving a vibration applying unit, such as an exciter installed in a chair, during reproduction of the above-mentioned XR content so as to cause a user to spuriously experience reproduced images and sense of vibration and/or impact corresponding to sounds (see Japanese Laid-open Patent Publication No. 2007-324829, for example).

However, the above-mentioned conventional technologies have room for improvement in increasing presence by vibration stimulation during reproduction of contents.

For example, a low-frequency range is commonly cut by a high-pass filter (HPF) in recording contents in an external environment in order to remove noise such as sound of footsteps and wind noise. Thus, a low-frequency range is insufficient in sounds recorded in the external environment, so that it is difficult for a user to obtain presence even if vibration is generated on the basis of the above-mentioned sounds.

Provision targets of vibration, such as a chair and a user, are made from different materials or have different types in a case of chairs, and have different builds in a case of users, and thus features are commonly different with respect to the same vibration stimulation. Therefore, there presents a problem that intended vibration is not transmitted, and thus a user is not able to obtain presence.

SUMMARY

An information processing apparatus according to one aspect of embodiments includes a control unit that generates a vibration stimulation signal to be provided to a user based on a sound signal in a content, wherein the control unit is configured to: acquire data of a content including a sound signal; execute an analysis process on the sound signal; and generate a vibration stimulation signal to be provided to a user in a conversion process of the sound signal according to a result of the analysis process.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIGS. 14 to 16 are supplementary diagrams illustrating a sound signal converting process according to the second embodiment;

FIG. 18 is a flowchart illustrating a processing procedure to be executed by the distant-location device according to the third embodiment.

DESCRIPTION OF EMBODIMENTS

Hereinafter, embodiments of an information processing apparatus, an information processing system, and an information processing method will be described in detail with reference to the accompanying drawings. Moreover, the disclosed technology is not limited to the embodiments described below.

Hereinafter, a plurality of configuration elements having substantially the same functional configuration may be differentiated from each other by providing thereto different numbers with hyphens after the same reference symbol. For example, a plurality of configurations having substantially the same functional configuration are differentiated as needed by indicating, for example, a distant-location device 100-1 and a distant-location device 100-2. In a case where there presents no need for differentiating a plurality of configuration elements having substantially the same functional configuration, the same reference symbol alone is provided. For example, in a case where there presents no need for differentiating the distant-location device 100-1 and the distant-location device 100-2, each of them is simply referred to as a distant-location device 100.

Figure 1:
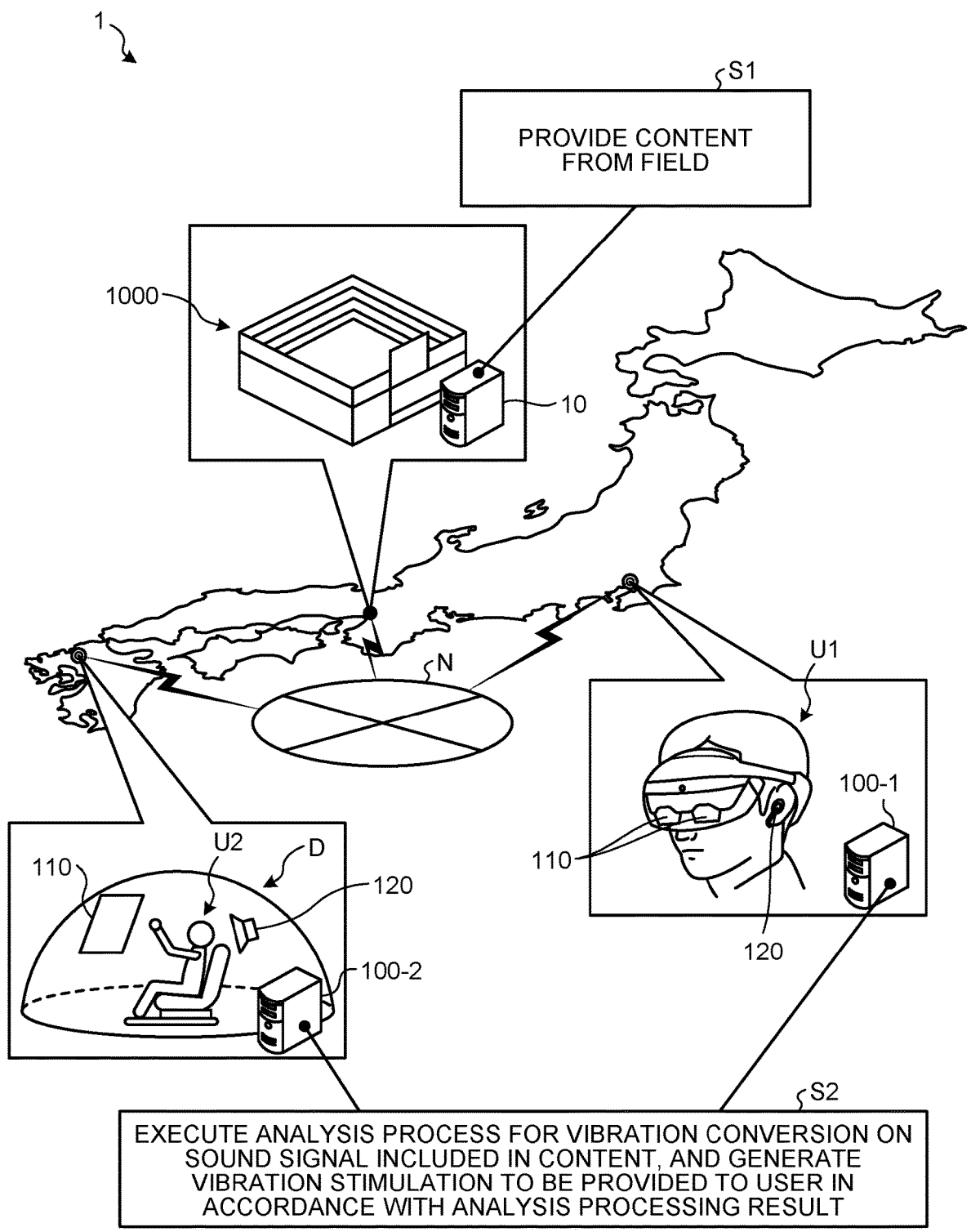
FIG. 1 is a diagram schematically illustrating an information processing method according to embodiments.

The outline of an information processing method according to the embodiments will be explained with reference to FIG. 1. FIG. 1 is a diagram schematically illustrating the information processing method according to the embodiments.

An information processing system 1 according to the embodiments is a system that provides an XR content having a live-experience type including on-the-spot images and sounds to a distant location other than the spot from an event site such as an exhibition site, a concert site, a fireworks-event site, and an e-sports competition site. Note that an XR content corresponds to one example of a "content".

As illustrated in FIG. 1, the information processing system 1 includes an on-the-spot device 10 and the at least one distant-location device 100. The on-the-spot device 10 and the at least one distant-location device 100 are configured to communicate with each other via a network N such as the Internet.

The example illustrated in FIG. 1 indicates a situation where the on-the-spot device 10 live-streams an XR content including images and sounds of an event that is being held at an event site 1000 in Kansai region to the at least one distant-location device 100 in various locations.

The example illustrated in FIG. 1 indicates a situation where the distant-location device 100-1 presents an XR content delivered from the on-the-spot device 10 to a user U1 in Kanto region via an HMD.

An HMD is an information processing terminal for presenting an XR content to the user U1 and further causing the user U1 to enjoy XR experience. The HMD is a wearable computer that is worn on a head of the user U1 to be used, and in the example illustrated in FIG. 1, has a goggle-type. Note that the HMD may have an eyeglass-type or a hat-type.

The HMD includes an image outputting unit 110 and a sound outputting unit 120. The image outputting unit 110 displays an image included in an XR content that is provided from the on-the-spot device 10. In a case of the example illustrated in FIG. 1, the image outputting unit 110 of the HMD is configured to be arranged before eyes of the user U1.

The sound outputting unit 120 outputs sound included in an XR content that is provided from the on-the-spot device 10. In a case of the example illustrated in FIG. 1, the sound outputting unit 120 of the HMD is configured to have an earphone-type, for example, and is attached to an ear of the user U1.

The example illustrated in FIG. 1 indicates a situation where the distant-location device 100-2 presents an XR content delivered from the on-the-spot device 10 to a user U2 in Kyushu region via a satellite dome D.

The satellite dome D is an audiovisual facility of an XR content and is formed in dome-shaped, and includes the image outputting unit 110 and the sound outputting unit 120. In a case of the example illustrated in FIG. 1, the image outputting unit 110 of the satellite dome D is arranged on a wall surface. The image outputting unit 110 is realized by a configuration obtained by arranging a thin liquid crystal display or an organic Electro Luminescence (EL) display on the wall surface, or a configuration for projecting an image on the wall surface by using a projector, for example. The sound outputting unit 120 of the satellite dome D is arranged near a head position of the sitting user U2.

Although illustration thereof is omitted in FIG. 1, a vibration outputting unit 130 is arranged near each of the users U1 and U2 (see FIG. 4 or later). The vibration outputting unit 130 outputs vibration corresponding to sounds included in an XR content so as to give a vibration stimulation to each of the users U1 and U2. The vibration outputting unit 130 is realized by a vibration applying unit such as an exciter, and is arranged in a chair on which each of the users U1 and U2 is sitting, or is attached to each of the users U1 and U2.

Incidentally, a low-frequency range is commonly cut by an HPF in recording sounds in an external environment in order to remove noise such as sound of footsteps and wind noise. However, if a sound signal having passed through the above-mentioned HPF is input to the vibration outputting unit 130 so as to provide a vibration stimulation to each of the users U1 and U2, a low-frequency range is insufficient, so that it is difficult for the users U1 and U2 to obtain presence.

Thus, for example, a sound signal may be input to the vibration outputting unit 130 via an equalizer that is configured to increase a low-frequency range while employing the already-known technology. On the other hand, in a case where a low-frequency range is increased by using an equalizer, there presents a problem that an uncut remaining low-frequency noise is also increased, and an already-cut frequency range is not able to be increased enough to contribute to improve in presence by using the equalizer alone.

Provision targets of vibration, such as a chair and a user, are made from different materials or have different types in a case of chairs, and have different builds in a case of users, and thus features are commonly different with respect to the same vibration stimulation. Therefore, there presents a problem that intended vibration is not transmitted, and thus a user is not able to obtain presence.

In this point, when the already-known technology is employed, for example, adjustment may be performed depending on sense of a user, or adjustment may be performed so as to approximate to a desired vibration of a stimulation presenter with reference to an actual measured value of an acceleration sensor. However, in a case of adjustment that is depending on sense of a user, reproduction of a desired vibration of a stimulation presenter is difficult, and in a case of adjustment performed by a stimulation presenter with reference to an actual measured value, a stimulation presenter having know-how thereof is always necessary.

Thus, the information processing method according to the embodiments includes acquiring an XR content that includes a sound signal, executing an analysis process for a vibration conversion on the sound signal, and generating a vibration stimulation to be provided to a user in accordance with an analysis processing result.

Specifically, as illustrated in FIG. 1, in the information processing method according to the embodiments, first, the on-the-spot device 10 provides an XR content from a field (Step S1). Next, the distant-location device 100 executes an analysis process for a vibration conversion on a sound signal included in the provided XR content, and generates a vibration stimulation to be provided to a user in accordance with an analysis processing result (Step S2).

For example, in the information processing method according to the embodiments, (1) a frequency analysis is executed on a sound signal by a method such as Fast Fourier Transform (FFT). As a result, in a case where a level of a predetermined low-frequency range is less than a preliminarily-set threshold, frequency is divided by N (1/N) by a pitch shift, and in a case where the level of the predetermined low-frequency range is not less than the preliminarily-set threshold, outputs without change.

For example, in the information processing method according to the embodiments, (2) a sound-source estimation is executed on the sound signal by using an Artificial Intelligence (AI) inference model that estimates a sound source based on a sound signal. As a result, by setting, in a case where the sound source is a division target, a frequency is divided by N by a pitch shift, in a case where the sound source is not a division target, outputs without change.

For example, in the information processing method according to the embodiments, (3) as a method other than the pitch shift, a threshold is set to a frequency A that is the lowest of an uncut frequency range, and in a case where a sound that is larger than the threshold is input, a signal constituted of frequencies equal to or less than the frequency A is input so as to increase a low-frequency range.

The above-mentioned (1) to (3) will be mentioned later with reference to FIGS. 2 to 12 as a first embodiment.

For example, in the information processing method according to the embodiments, (4) calibration is executed on a vibration feature in accordance with difference between targets to which vibration is provided, and states of the targets. The above-mentioned (4) will be mentioned later as a second embodiment with reference to FIGS. 13 to 16.

For example, in the information processing method according to the embodiment, (5) a specific scene is detected from an input image signal and an input sound signal. A frequency is divided by N by a pitch shift on the basis of a preliminarily-set vibration parameter in accordance with the detected scene. The above-mentioned (5) will be mentioned later as a third embodiment with reference to FIGS. 17 and 18.

In other words, in the information processing method according to the embodiments, as described in the above-mentioned (1) to (5), a vibration pattern to be provided to a user is generated in accordance with an analysis processing result. The distant-location device 100 drives the vibration outputting unit 130 on the basis of the generated vibration pattern so as to provide a vibration stimulation whose low-frequency range is increased, for example, or a vibration stimulation according to a target, for example.

Thus, it is possible to further improve presence by a vibration stimulation during reproduction of a content.

As described above, the information processing method according to the embodiments includes acquiring an XR content that includes a sound signal, executing an analysis process for a vibration conversion on the sound signal, and generating a vibration stimulation to be provided to a user in accordance with an analysis processing result.

Therefore, by employing the information processing method according to the embodiments, it is possible to further improve presence by a vibration stimulation during reproduction of a content. Hereinafter, embodiments of the information processing system 1 to which the information processing method according to the embodiments is applied will be specifically explained.

First Embodiment

Figure 2:
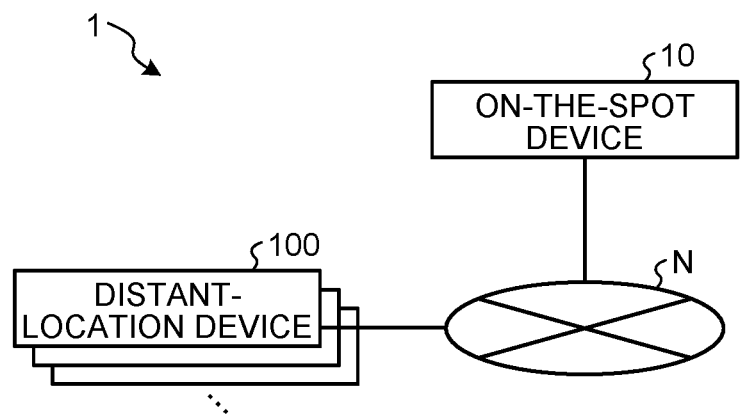
FIG. 2 is a diagram illustrating a configuration example of an information processing system according to a first embodiment.
Figure 3:
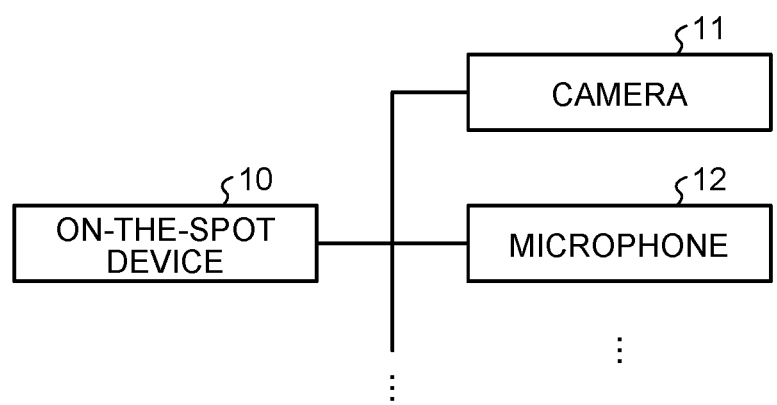
FIG. 3 is a diagram illustrating a configuration example of an on-the-spot device according to the first embodiment.

FIG. 2 is a diagram illustrating a configuration example of the information processing system 1 according to the first embodiment. FIG. 3 is a diagram illustrating a configuration example of the on-the-spot device 10 according to the first embodiment. FIG. 4 is a diagram illustrating a configuration example of the distant-location device 100 according to the first embodiment. FIG. 5 is a diagram illustrating a configuration example of the vibration outputting unit 130.

As illustrated in FIG. 2, the information processing system 1 includes the on-the-spot device 10 and the at least one distant-location device 100. Each of the on-the-spot device 10 and the at least one distant-location device 100 is one example of an "information processing apparatus", and is realized by a computer. The on-the-spot device 10 and the at least one distant-location device 100 are connected to be able to communicate with each other via the network N such as the Internet, a dedicated network, and a mobile phone network.

As illustrated in FIG. 3, the on-the-spot device 10 includes an at least one camera 11 and an at least one microphone 12. The at least one camera 11 records an image of an external environment. The at least one microphone 12 records a sound of an external environment. The on-the-spot device 10 generates an XR content that includes an image recorded by the at least one camera 11 and a sound recorded by the at least one microphone 12, and further provides the generated XR content to the at least one distant-location device 100.

Figure 4:
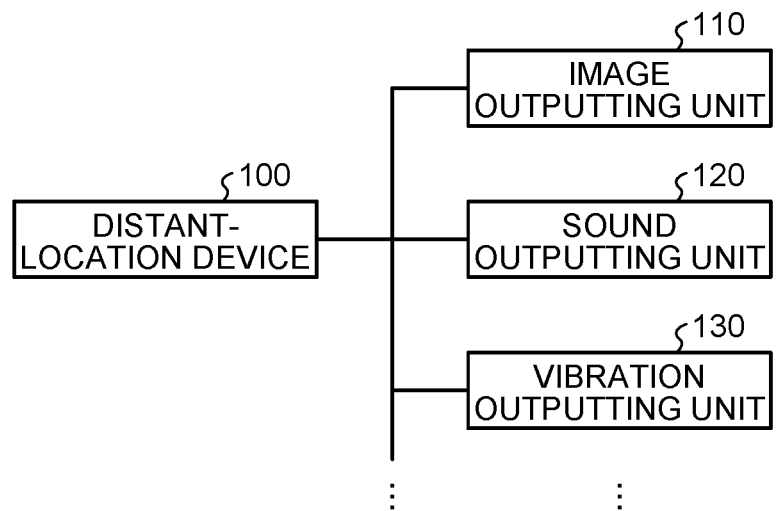
FIG. 4 is a diagram illustrating a configuration example of a distant-location device according to the first embodiment.
Figure 5:
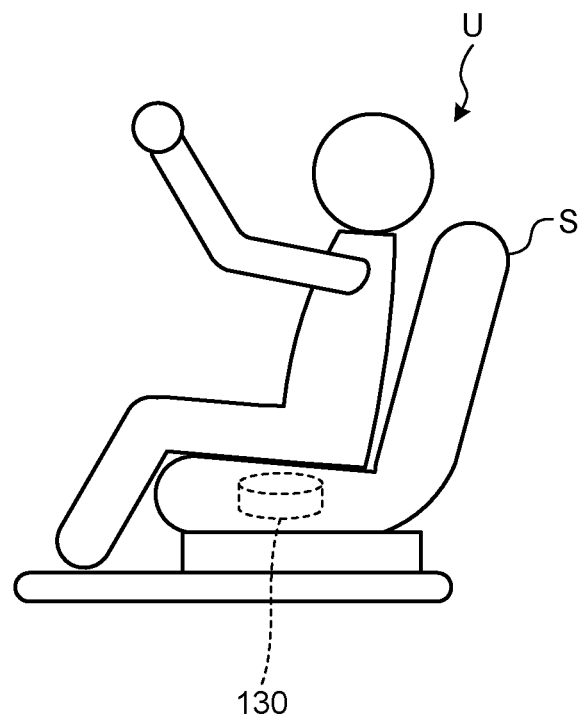
FIG. 5 is a diagram illustrating a configuration example of a vibration outputting unit.

As illustrated in FIG. 4, the distant-location device 100 includes the image outputting unit 110, the sound outputting unit 120, and the vibration outputting unit 130. The image outputting unit 110 displays an image included in an XR content provided from the on-the-spot device 10. The sound outputting unit 120 outputs a sound included in the XR content.

The vibration outputting unit 130 outputs a vibration according to a sound included in the XR content. As already-described above, as illustrated in FIG. 5, the vibration outputting unit 130 is arranged in a chair S on which a user U is sitting, for example. The vibration outputting unit 130 may be configured to be embedded in clothes, a seatbelt, or the like so as to be attached to the user U. Note that the vibration outputting unit 130 houses therein a well-known vibration converting device such as an electric vibration convertor constituted of a magnet (magnetic circuit) and a coil through which drive current flows, and an electric-power amplifier that is made from a piezoelectric element so as to amplify a signal up to a level needed for driving.

Figure 6:
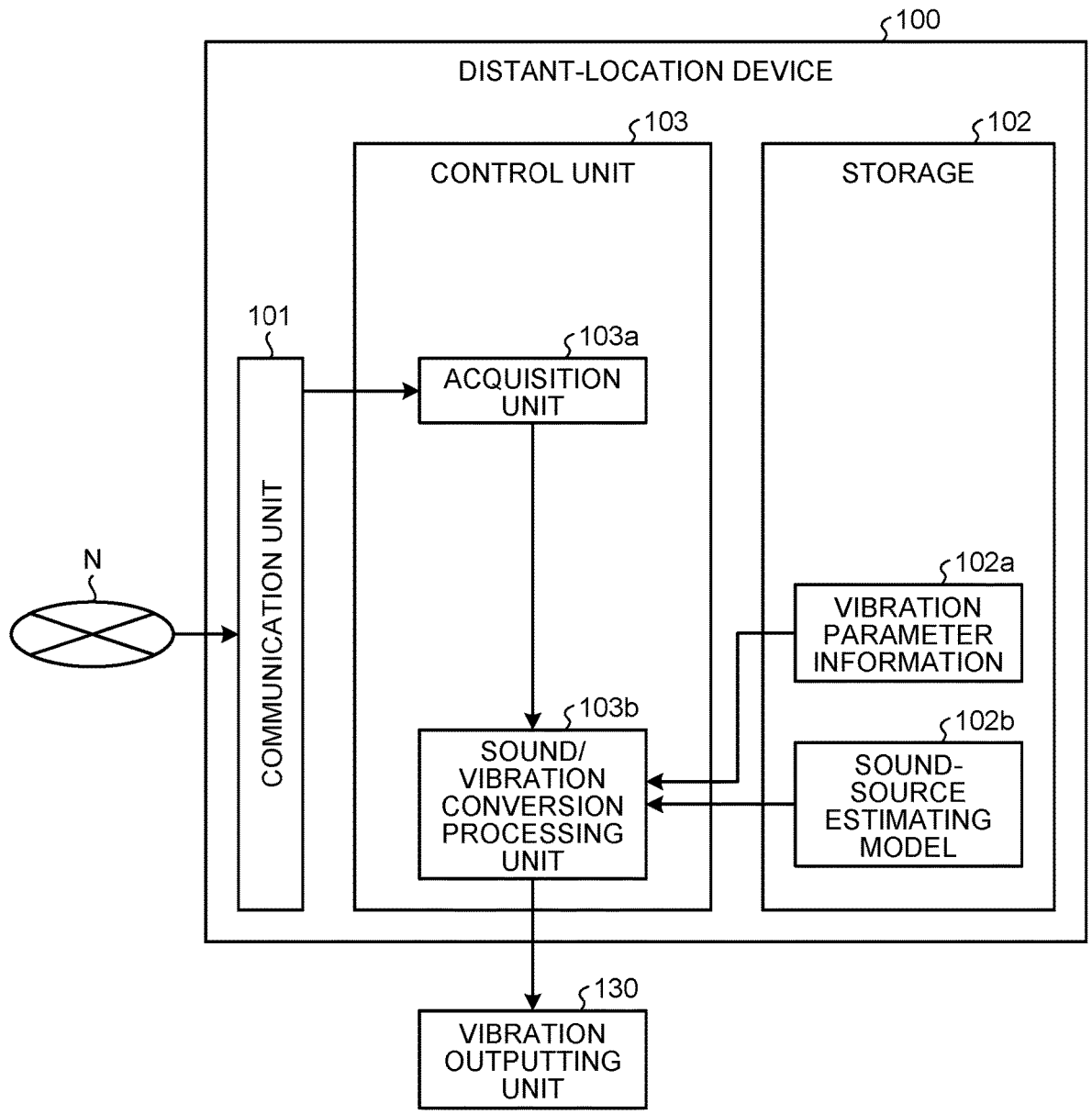
FIG. 6 is a block diagram illustrating the distant-location device according to the first embodiment.
Figure 7:
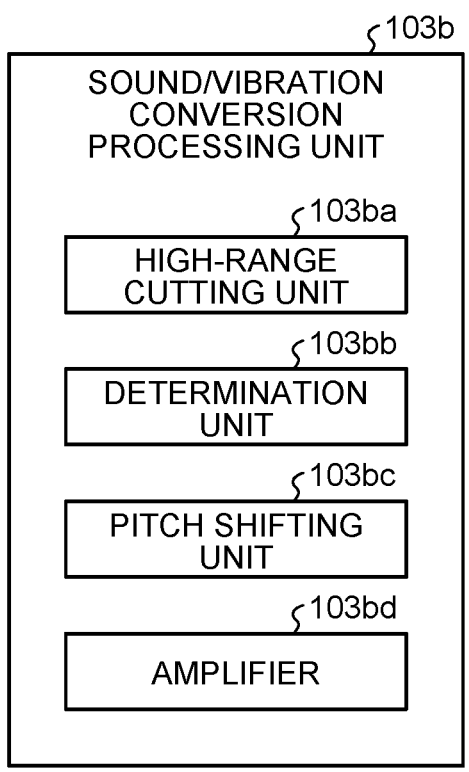
FIG. 7 is a block diagram illustrating a sound/vibration conversion processing unit.

Next, FIG. 6 is a block diagram illustrating the distant-location device 100 according to the first embodiment. FIG. 7 is a block diagram illustrating a sound/vibration conversion processing unit 103b. In FIGS. 6 and 7 and FIGS. 13 and 17, configuration elements needed for explaining features of the embodiments alone are described, and explanation of general configuration elements is omitted.

In other words, specific forms of distribution and integration of the configuration elements illustrated in FIGS. 6 and 7 and FIGS. 13 and 17 are not limited to those illustrated in the drawings. All or some of the devices can be configured by separating or integrating the apparatus functionally or physically in any unit, according to various types of loads, the status of use, etc.

In the explanation of FIGS. 6 and 7 and FIGS. 13 and 17, explanation of already-explained configuration elements may be simplified or omitted.

As illustrated in FIG. 6, the distant-location device 100 according to the embodiment includes a communication unit 101, a storage 102, and a control unit 103. The vibration outputting unit 130 is connected to the at least one distant-location device 100. Illustration of the image outputting unit 110 and the sound outputting unit 120 is intentionally omitted in order to further clarify features of the embodiment.

The communication unit 101 is realized by, for example, a Network Interface Card (NIC) and the like. The communication unit 101 and the network N are connected to each other in a wired/wireless manner so as to transmit and receive information to and from the on-the-spot device 10 via the network N.

The storage 102 is realized by a semiconductor memory element such as a Random Access Memory (RAM) and a Flash Memory, or a storage such as a hard disk and an optical disk. In the example illustrated in FIG. 6, the storage 102 stores therein vibration parameter information 102*a* and a sound-source estimating model 102*b*.

The vibration parameter information 102*a* is information that includes various parameters related to a vibration to be output to the vibration outputting unit 130, and that includes various thresholds to be used in determination to be mentioned later, for example. The sound-source estimating model 102*b* is an AI inference model that estimates a sound source on the basis of the above-mentioned sound signal.

The sound-source estimating model 102*b* outputs as a result, while using a sound signal as an input, a sound source class having the highest probability of a probability distribution in a final layer via an already-learned neural network. Learning is executed, by using a sound signal and information on a sound source class provided to the sound signal, which is to be correct answer data, such that a cost between an output result of a classifier and the correct answer data reduces. The correct answer data is collected via manual annotation, for example.

The control unit 103 is a controller, and, for example, a Central Processing Unit (CPU), a Micro Processing Unit (MPU), or the like executes not-illustrated various programs stored in the storage 102 while using the RAM as a work region so that the control unit 103 is realized. The control unit 103 may be realized by an integrated circuit such as an Application Specific Integrated Circuit (ASIC) and a Field Programmable Gate Array (FPGA).

The control unit 103 includes an acquisition unit 103*a* and a sound/vibration conversion processing unit 103*b* so as to realize and execute the following functions and actions of information processing.

The acquisition unit 103*a* acquires an XR content provided from the on-the-spot device 10 via the communication unit 101.

The sound/vibration conversion processing unit 103*b* receives a sound signal included in the XR content acquired by the acquisition unit 103*a*, and further executes an analysis process for a vibration conversion. The sound/vibration conversion processing unit 103*b* generates a vibration pattern to be provided to a user in accordance with an analysis processing result.

As illustrated in FIG. 7, the sound/vibration conversion processing unit 103*b* includes a high-range cutting unit 103*ba*, a determination unit 103*bb*, a pitch shifting unit 103*bc*, and an amplifier 103*bd*.

The high-range cutting unit 103*ba* cuts, by using a low-pass filter (LPF), a high-frequency range that is not needed in a vibration conversion, as preprocessing for a sound signal whose low range has been already cut by using an HPF in recording. This is because a human being mainly and strongly feels a low-range component of vibration as vibration. The determination unit 103*bb* receives and analyzes a sound signal whose high-frequency range has been cut so as to determine necessity/unnecessity of a pitch shift.

The determination unit 103*bb* determines necessity/unnecessity of a pitch shift by a frequency analysis such as FFT. For example, the determination unit 103*bb* inputs a sound signal to the sound-source estimating model 102*b*, and determines necessity/unnecessity of a pitch shift on the basis of an output result of the sound-source estimating model 102*b* in response to the above-mentioned input.

In a case where the determination unit 103*bb* determines that a pitch shift is necessary, the pitch shifting unit 103*bc* executes a pitch shift on a sound signal. The amplifier 103*bd* amplifies and outputs the sound signal as a vibration signal to the vibration outputting unit 130.

Figure 8:
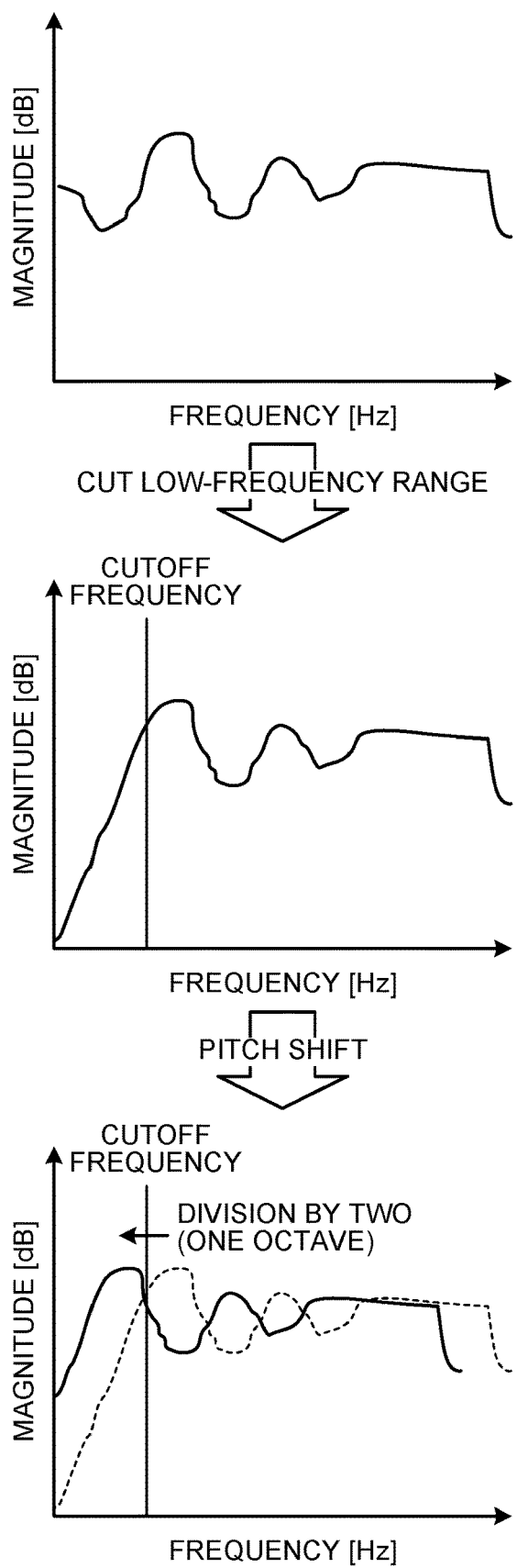
FIGS. 8 to 10 are supplementary diagrams illustrating a sound signal converting process according to the first embodiment.
Figure 9:
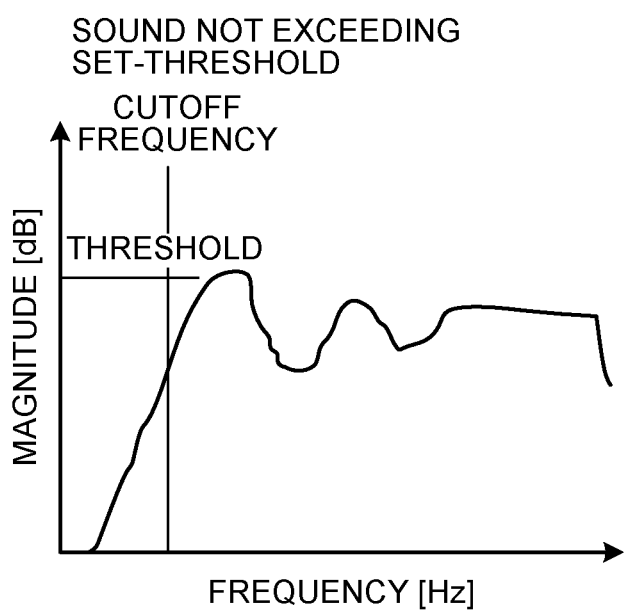
Figure 10:
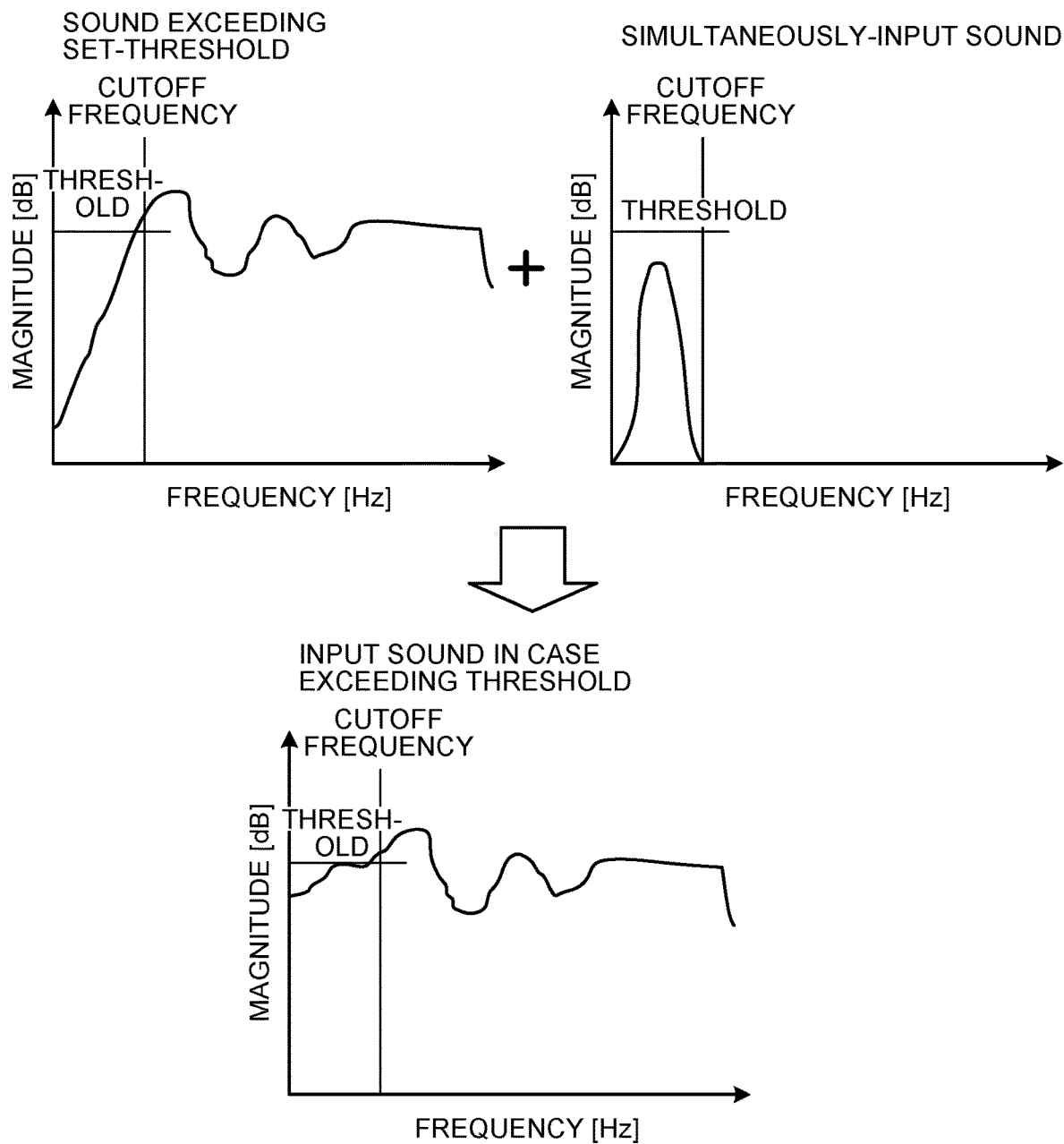

Herein, explanation of the sound signal converting process is supplemented with reference to FIGS. 8 to 10. FIGS. 8 to 10 are supplementary diagrams illustrating the sound signal converting process according to the first embodiment.

As illustrated in upper and middle parts of FIG. 8, a low-frequency range of actual environmental sound recorded in a field is cut by an HPF. As a result, in a case where a signal level of a predetermined frequency range is less than the set threshold, for example, in a case where an average level of 20 Hz is equal to or less than −20 dB, as illustrated in a lower part of FIG. 8, in the sound signal converting process, a frequency is divided by N (herein, N=2) by a pitch shift. Note that the example illustrated in FIG. 8 corresponds to the above-mentioned (1). For example, with respect to the above-mentioned predetermined frequency range and threshold, appropriate values are decided on the basis of a sensory analysis result and the like.

As illustrated in FIG. 9, a threshold is set to a cutoff frequency that is the lowest frequency of an uncut remaining frequency range, in a case where a sound level of the cutoff frequency does not exceed the threshold, a low-frequency range is not increased in the sound signal converting process.

On the other hand, as illustrated in FIG. 10, in a case where a sound of the cutoff frequency exceeds the threshold, in the sound signal converting process, a signal (for example, signal for providing appropriate sense, which is generated on the basis of sensory analysis result and the like) constituted of a frequency equal to or less than the cutoff frequency is simultaneously input so as to increase a low-frequency range. Note that the examples illustrated in FIGS. 9 and 10 correspond to the above-mentioned (3). The above-mentioned method is supposed to be used in a case where increase in a low-frequency range contributes to improvement in presence, but frequency division is not effective.

Figure 11:
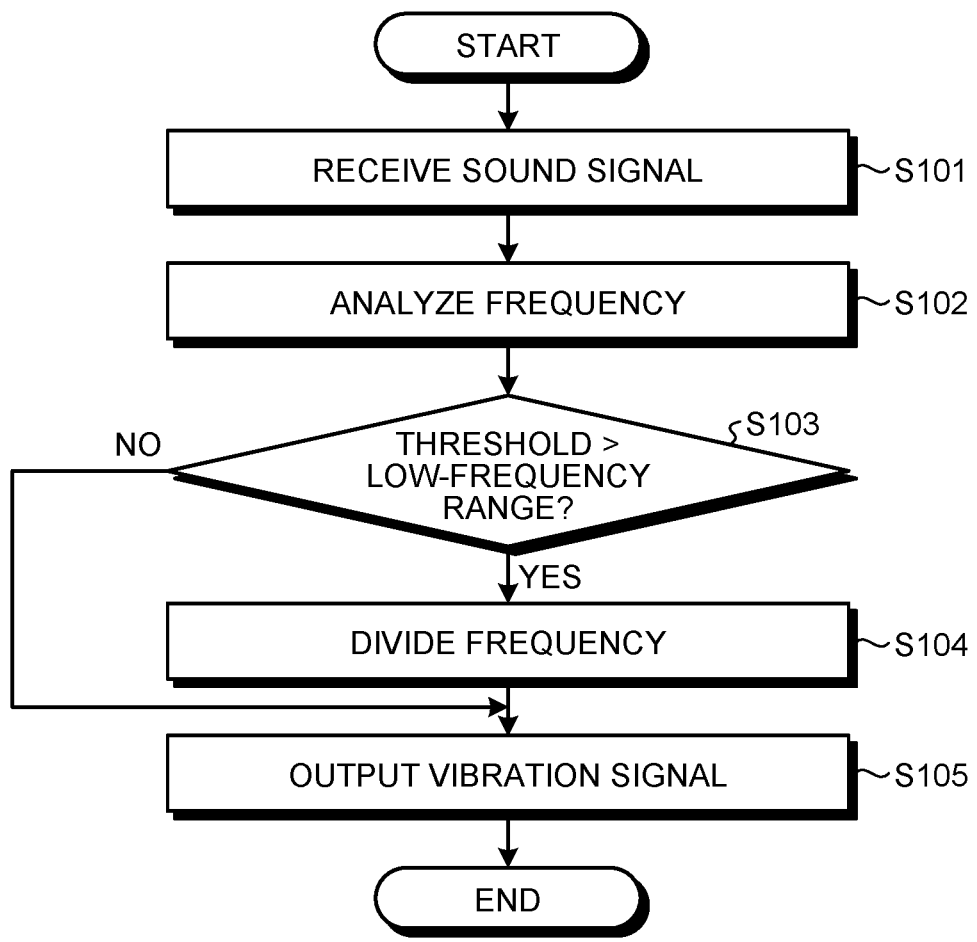
FIGS. 11 and 12 are flowcharts illustrating a processing procedure to be executed by the distant-location device according to the first embodiment.
Figure 12:
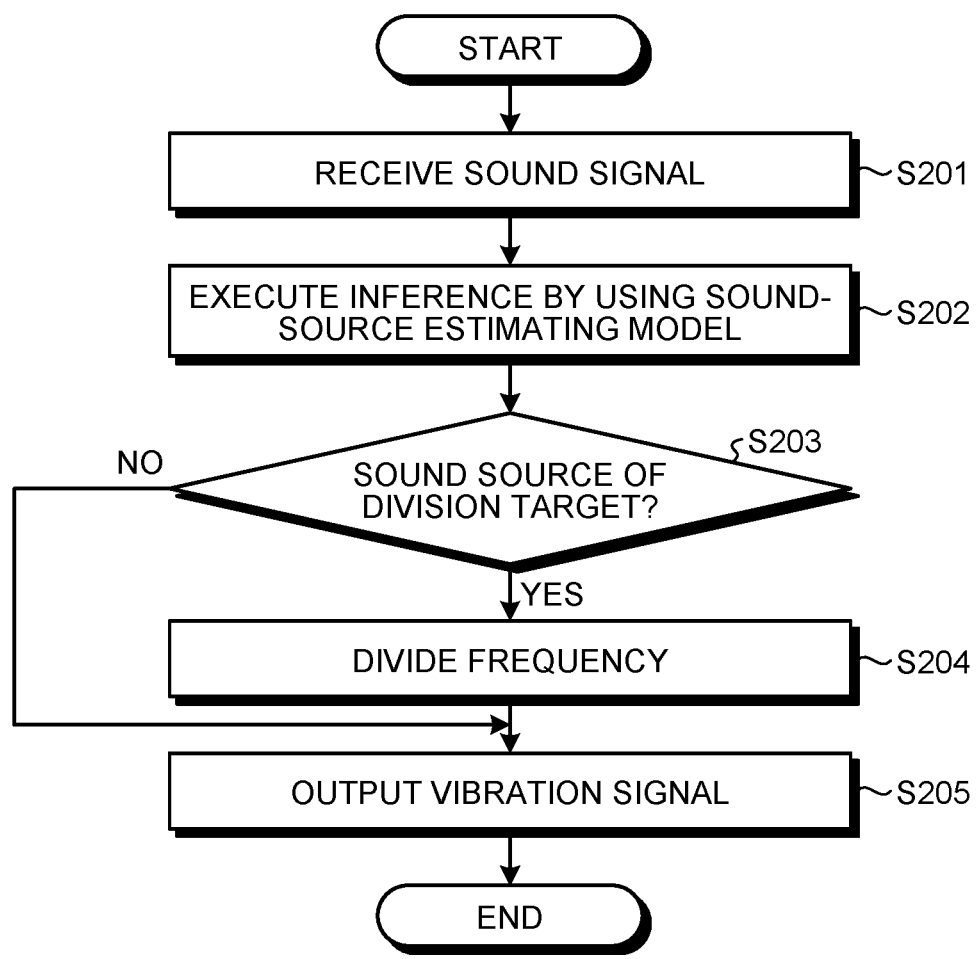

Next, a processing procedure to be executed by the distant-location device 100 will be explained with reference to FIGS. 11 and 12. FIG. 11 is a flowchart illustrating the processing procedure to be executed by the distant-location device 100 according to the first embodiment. FIG. 12 is a flowchart illustrating the processing procedure to be executed by the distant-location device 100 according to the first embodiment.

A processing procedure of the sound signal converting process is mainly illustrated in FIGS. 11 and 12. FIG. 11 corresponds to the above-mentioned (1). FIG. 12 corresponds to the above-mentioned (2).

In a case of the above-mentioned (1), as illustrated in FIG. 11, the sound/vibration conversion processing unit 103*b* first receives a sound signal (Step S101), and further executes a frequency analysis on the above-mentioned sound signal (Step S102).

Whether or not a signal level of the predetermined low-frequency range is less than a set threshold is determined (Step S103). In a case where the signal level is less than the threshold (Step S103: Yes), frequency division is executed (Step S104), and the divided sound signal is output to the vibration outputting unit 130 as a vibration signal (Step S105). Next, the processing is ended.

On the other hand, in a case where the signal level exceeds the threshold (Step S103: No), the sound signal is output as a vibration signal to the vibration outputting unit 130 without change (Step S105). Next, the processing is ended. In a case of the above-mentioned (3), the process of Step S104 is a process for adding a signal constituted of a frequency that is equal to or less than a cutoff frequency.

In a case of the above-mentioned (2), as illustrated in FIG. 12, the sound/vibration conversion processing unit 103b first receives a sound signal (Step S201), and further executes inference on the above-mentioned sound signal by using the sound-source estimating model 102b (Step S202).

As the inference result, whether or not a sound source of a division target is determined (Step S203). In a case where being a sound source of a division target (Step S203: Yes), frequency division is executed (Step S204), and the divided sound signal is output to the vibration outputting unit 130 as a vibration signal (Step S205). Next, the processing is ended.

On the other hand, in a case where not being a sound source of a division target (Step S203: No), a sound signal is output to the vibration outputting unit 130 as a vibration signal without change (Step S205). Next, the processing is ended.

Second Embodiment

Figure 13:
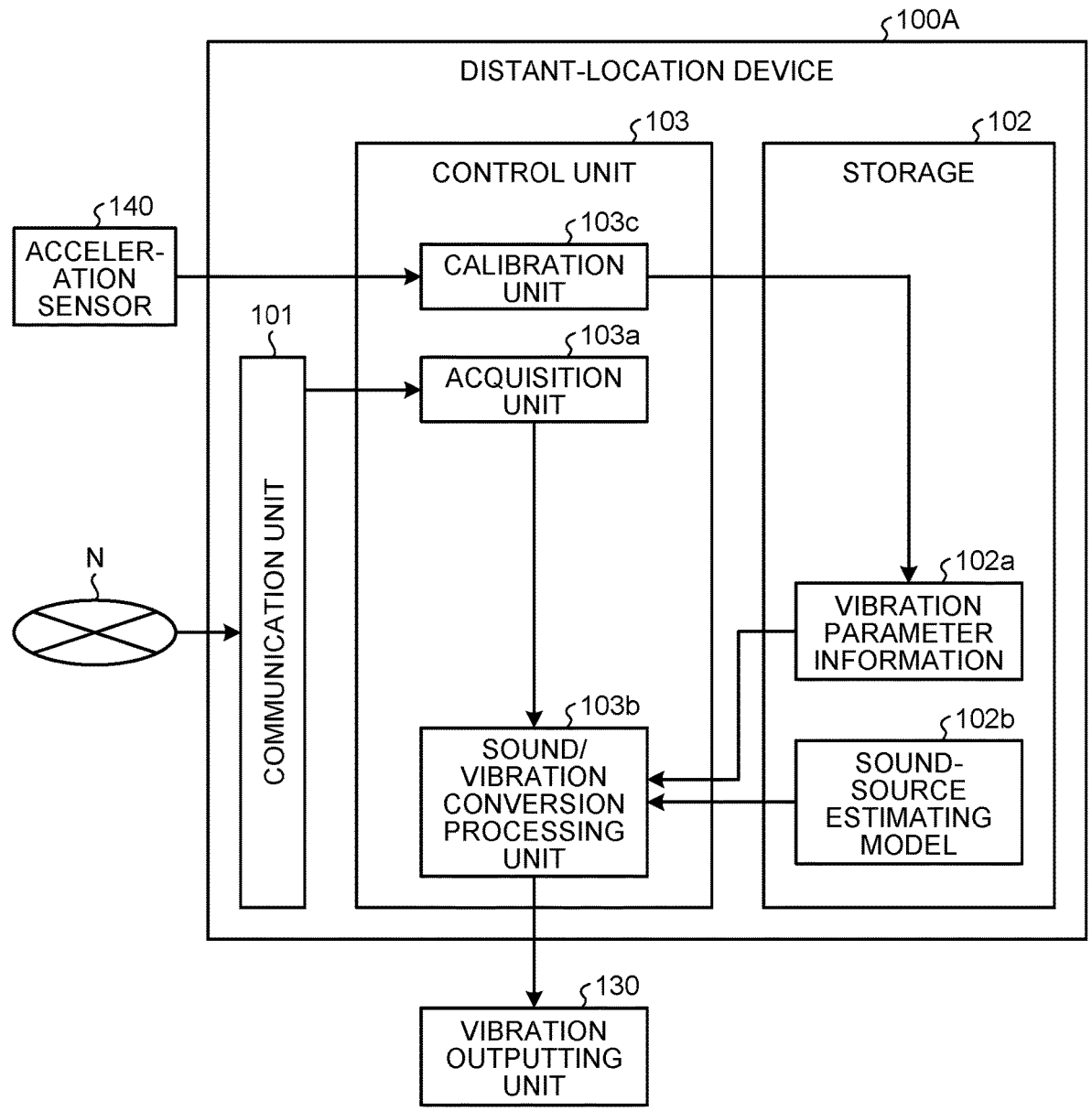
FIG. 13 is a block diagram illustrating a distant-location device according to a second embodiment.
Figure 14:
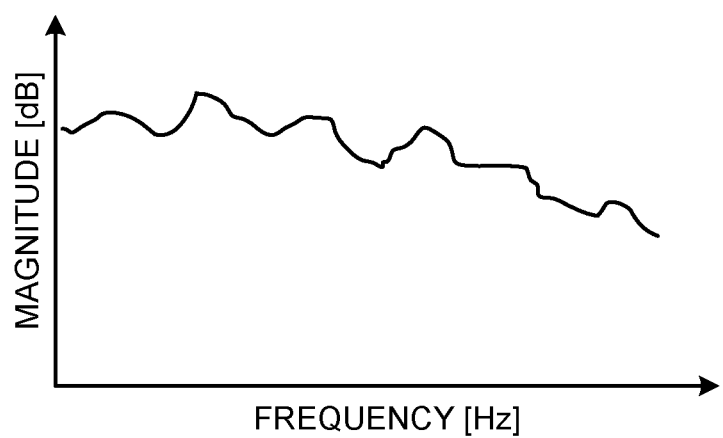
Figure 15:
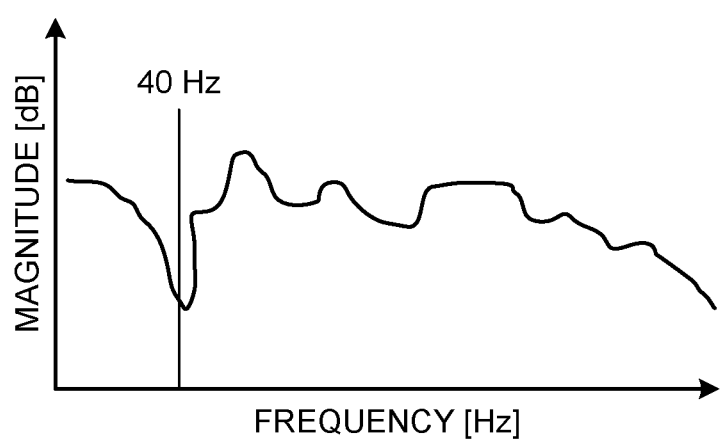

Next, the second embodiment corresponding to the above-mentioned (4) will be explained. FIG. 13 is a block diagram illustrating a distant-location device 100A according to the second embodiment. Note that FIG. 13 corresponds to FIG. 6, and thus a part different from FIG. 6 will be mainly explained. FIGS. 14 to 16 are supplementary diagrams illustrating the sound signal converting process according to the second embodiment.

As illustrated in FIG. 13, the distant-location device 100A is different from the first embodiment in that the distant-location device 100A further includes an acceleration sensor 140 and a calibration unit 103c. The calibration unit 103c calibrates a vibration feature in accordance with difference between targets to be vibrated and states of the targets.

First, a case of calibrating difference between targets to be vibrated will be explained. In this case, before presenting an actual vibration, the calibration unit 103c acquires a vibration feature in a case where a predetermined reference signal is provided to a reference target. For example, the acceleration sensor 140 is arranged on a seating face of a reference chair α so as to acquire an actual vibration feature of the chair α in a case where a reference signal is provided. The signal for vibration is configured to generate a vibration signal so as to achieve a target vibration on the basis of a feature of the above-mentioned reference chair α. In the example illustrated in FIG. 14, if a vibration feature of a used chair is approximate to a vibration feature of the above-mentioned reference chair α, a desired vibration is able to be provided to a user.

On the other hand, the calibration unit 103c acquires a vibration feature in a case where the same reference signal is provided to a vibration device that is used by a user who is to receive actual vibration. In this case, for example, the acceleration sensor 140 is arranged on a seating face of a wheelchair β, so as to acquire an actual vibration feature when a reference signal is input to the wheelchair 3. Assume that FIG. 15 indicates a vibration feature of the above-mentioned wheelchair β.

The calibration unit 103c adjusts an output level in each frequency of a vibration signal to be output to the wheelchair β so as to reduce difference between a vibration feature of the chair α and a vibration feature of the wheelchair β.

For example, as illustrated in FIGS. 14 and 15, assume that the wheelchair β, has a vibration feature that a vibration at 40 Hz extremely attenuates compared with the chair α. In this case, as illustrated in FIG. 16, the calibration unit 103c adjusts, by using an equalizer, a vibration signal to be output to the wheelchair β, so as to increase a level of 40 Hz by equal to or more than +2 dB. The calibration unit 103c stores such an adjustment feature in the vibration parameter information 102a so that the sound/vibration conversion processing unit 103b executes adjustment when actually providing vibration to the wheelchair β.

Next, calibration that is based on a state of a target will be explained. Measurement of sense of a human being with respect to vibration that is received via skin is difficult; however, there has been known that an intensity of vibration stimulation that is felt by a human being is commonly related to an amount of his/her stored fat.

Thus, the calibration unit 103c previously stores therein parameters for vibration adjustment by 10 kg increments with respect to a body weight, for example. The calibration unit 103c measures a body weight of a target person who is going to actually receive vibration. Assume that a body weight of a target person C is 80 kg, for example.

Next, the calibration unit 103c adjusts a vibration feature for the target person C, namely, a person whose body weight is 80 kg, such that the above-mentioned target person C feels a vibration similar to that felt by a person B having an appropriate body weight. For example, a person whose body weight is 80 kg is estimated to be difficult to feel vibration compared with a person whose body weight is 60 kg, in this case, the calibration unit 103c adjusts an output level of vibration for the target person C to be larger than that for a person whose body weight is 60 kg by +2 dB, for example. Note that in the present example, adjustment is executed on a vibration level (amplitude) in accordance with a body weight; however, various parameters for vibration adjustment such as a feature of a vibration frequency level may be adjusted, in accordance with a body weight.

As described above, calibration of a vibration feature is executed in accordance with difference between targets to be vibrated and states of the targets, so that it is possible to improve presence provided by a vibration stimulation independent of a target. Note that calibration in which a vibration (signal) is actually provided to a target to be vibrated and a response thereof is measured and calibration is executed in accordance with the result may be referred to as an actual-measurement type, and calibration in which a state (body weight and the like) of a target is detected and calibration is executed in accordance with the detection result may be referred to as an inference type.

In the above-mentioned inference-type example, a body weight is exemplified as a state of a target to be vibrated; however, not limited thereto, for example, a bone density, an age, a gender, or the like may be employed.

Third Embodiment

Figure 17:
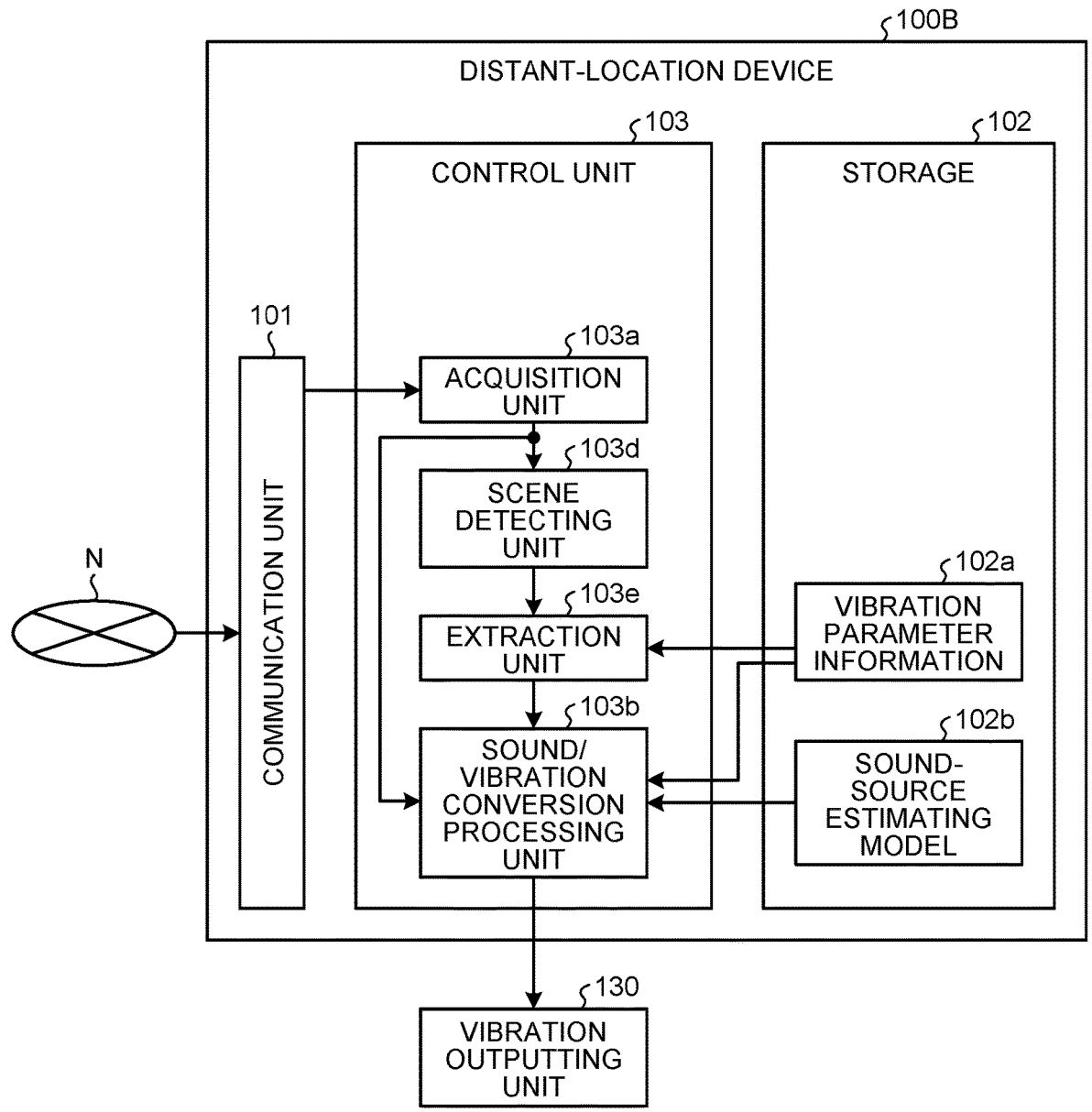
FIG. 17 is a block diagram illustrating a distant-location device according to a third embodiment.

The third embodiment corresponding to the above-mentioned (5) will be explained. FIG. 17 is a block diagram illustrating a distant-location device 100B according to the third embodiment. FIG. 17 corresponds to FIG. 6 similarly to FIG. 13, and thus a part different from FIG. 6 will be mainly explained.

As illustrated in FIG. 17, the distant-location device 100B is different from the first embodiment in that the distant-location device 100B further includes a scene detecting unit 103*d* and an extraction unit 103*e*.

The scene detecting unit 103*d* detects a specific scene from an image signal and a sound signal of an XR content that is acquired by the acquisition unit 103*a*. For example, the scene detecting unit 103*d* detects a scene by arrival of a preliminarily-set time point. In this case, an occurrence time point (playback-position time point of XR content) of a specific scene is to be preliminarily specified by a manual operation. As the above-mentioned specifying of the occurrence time point, there are considered a methods for directly specifying a time point and a method for specifying a target scene class by a process for matching a scene estimated from scene data, image/sound data, etc. that are included in XR content data and playback-position time point data with each other.

The scene detecting unit 103*d* detects a scene based on positional relation with respect to an object in an XR content. For example, a case within a predetermined distance from fireworks is considered. For example, the approach within the predetermined distance is determined by an object (class) included in an XR content data and positional data thereof. The scene detecting unit 103*d* detects a scene from change in a situation in an XR content. For example, a case where a user enters a concert hall of a virtual space in an XR content is considered. The scene detecting unit 103*d* detects a scene from a contact relation with an object in an XR content. For example, a case where a user collides with something in a virtual space in an XR content is considered. For example, the detection of the collision is also determined by an object (class) included in an XR content data and positional data thereof.

A vibration parameter in each scene is preliminarily set in the vibration parameter information 102*a*, and the extraction unit 103*e* extracts a vibration parameter in accordance with a scene that is detected by the scene detecting unit 103*d*.

The sound/vibration conversion processing unit 103*b* executes a sound signal converting process on the basis of a vibration parameter that is extracted by the extraction unit 103*e*.

Next, a processing procedure to be executed by the distant-location device 100B will be explained with reference to FIG. 18. FIG. 18 is a flowchart illustrating a processing procedure to be executed by the distant-location device 100B according to the third embodiment.

As illustrated in FIG. 18, in the third embodiment, the scene detecting unit 103*d* detects a scene on the basis of an image signal and a sound signal of an XR content and the like (Step S301). The sound/vibration conversion processing unit 103*b* receives a sound signal (Step S302).

Whether or not the scene detected by the scene detecting unit 103*d* is a scene of a division target (whether or not scene is target of vibration emphasizing process) is determined (Step S303). Herein, in a case where the scene is a division target (Step S303: Yes), frequency division is executed (Step S304), and the divided sound signal is output to the vibration outputting unit 130 as a vibration signal (Step S305). Next, the processing is ended.

On the other hand, in a case where the scene is not a division target (Step S303: No), a sound signal is output to the vibration outputting unit 130 as a vibration signal without change (Step S305). Next, the processing is ended.

As described above, the at least one distant-location device 100, 100A, and 100B includes the control unit 103 that generates a vibration stimulation signal to be provided to a user based on a sound signal in a content, wherein the control unit 103 is configured to: acquire data of an XR content (corresponding to one example of "content") including a sound signal; execute an analysis process on the sound signal; and generate a vibration stimulation signal to be provided to a user in a conversion process of the sound signal according to a result of the analysis process.

Therefore, according to the at least one distant-location device 100, 100A, and 100B, it is possible to further improve presence by an appropriate vibration stimulation based on an analysis result during reproduction of an XR content.

The conversion process includes an emphasis process of a low frequency range in a vibration stimulation signal according to the result of the analysis process.

Therefore, according to the at least one distant-location device 100, 100A, and 100B, a low-frequency range in a vibration stimulation during reproduction of an XR content is emphasized to change it to an appropriate state, so that it is possible to further improve presence.

The emphasis process includes a division process of the sound signal used in the conversion process.

Therefore, according to the at least one distant-location device 100, 100A, and 100B, a low-frequency range in a vibration stimulation during reproduction of an XR content is emphasized by division of a sound signal to change it to an appropriate state, so that it is possible to further improve presence.

The division process includes: in accordance with the result of the analysis process, dividing a frequency of the sound signal by a pitch shift.

Therefore, according to the at least one distant-location device 100, 100A, and 100B, a low-frequency range in a vibration stimulation during reproduction of an XR content is emphasized by division of a sound signal with the use of a pitch shift to change it to an appropriate state, so that it is possible to further improve presence.

The conversion process includes: synthesizing a vibration signal constituted of a signal in a predetermined low frequency range.

Therefore, according to the at least one distant-location device 100, 100A, and 100B, a vibration whose low-frequency range is emphasized by a method other than a pitch shift is able to be generated, so that it is possible to further improve presence caused by a vibration stimulation during reproduction of an XR content.

The control unit 103 is further configured to: in a case where a level of a predetermined low-frequency range in the sound signal is less than a preliminarily-set threshold, execute the emphasis process.

Therefore, according to the at least one distant-location device 100, 100A, and 100B, necessity of the emphasis process, which is executed in the sound/vibration conversion processing unit 103*b*, for a low frequency range in a vibration to be provided is determined by a level of a predetermined low-frequency range so as to generate a vibration signal, so that it is possible to provide an appropriate vibration that is not excessively reinforced.

The control unit 103 is further configured to: estimate a sound source by an Artificial Intelligence (AI) inference model that estimates a sound source of the sound signal; and execute the conversion process corresponding to the estimated sound source.

Therefore, according to the at least one distant-location device 100, 100A, and 100B, a vibration is able to be generated in accordance with an inferred sound source, so that it is possible to further improve presence caused by a vibration stimulation during reproduction of an XR content.

The control unit 103 of the distant-location device 100B is further configured to: detect a specific scene from the XR content; and execute the conversion process corresponding to the detected scene.

Therefore, according to the distant-location device 100B, a vibration whose low-frequency range is emphasized is able to be generated in accordance with the detected scene, so that it is possible to further improve presence caused by a vibration stimulation during reproduction of an XR content.

The control unit 103 of the distant-location device 100A is further configured to: execute calibration on the conversion process in accordance with a vibration providing environment.

Therefore, according to the distant-location device 100A, a vibration that is adjusted in accordance with a situation of a target is able to be generated, so that it is possible to improve presence caused by a vibration stimulation independent of a target.

In the above-mentioned embodiments, a sound/vibration conversion process is explained to be executed by the distant-location device; however, may be executed by the on-the-spot device. In this case, an XR content to be provided includes a vibration signal for providing a vibration stimulation. Furthermore, data needed for calibration and the like is communicated between the distant-location device and the on-the-spot device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising a controller that generates a vibration stimulation signal to be provided to a user based on a sound signal in a content, wherein
the controller is configured to:
acquire data of the content including the sound signal;
execute an analysis process on the sound signal; and
generate a vibration stimulation signal to be provided to the user in a conversion process of the sound signal according to a result of the analysis process, wherein
the conversion process includes an emphasis process of a low frequency range in a vibration stimulation signal according to the result of the analysis process, and
the emphasis process includes a division process of the sound signal used in the conversion process.

2. The information processing apparatus according to claim 1, wherein
the division process includes:
in accordance with the result of the analysis process, dividing a frequency of the sound signal by a pitch shift.

3. The information processing apparatus according to claim 1, wherein
the conversion process includes:
synthesizing a vibration signal constituted of a signal in a predetermined low frequency range.

4. The information processing apparatus according to claim 2, wherein
the controller is further configured to:
in a case where a level of a predetermined low-frequency range in the sound signal is less than a preliminarily-set threshold, execute the emphasis process.

5. The information processing apparatus according to claim 3, wherein
the controller is further configured to:
in a case where a level of a predetermined low-frequency range in the sound signal is less than a preliminarily-set threshold, execute the emphasis process.

6. The information processing apparatus according to claim 1, wherein
the controller is further configured to:
estimate a sound source by an Artificial Intelligence (AI) inference model that estimates a sound source of the sound signal; and
execute the conversion process corresponding to the estimated sound source.

7. The information processing apparatus according to claim 1, wherein
the controller is further configured to:
detect a specific scene from the content; and
execute the conversion process corresponding to the detected specific scene.

8. The information processing apparatus according to claim 1, wherein
the controller is further configured to:
execute calibration on the conversion process in accordance with a vibration providing environment.

9. An information processing apparatus comprising a controller that generates a vibration stimulation signal to be provided to a user based on a sound signal in a content, wherein
the controller is configured to:
acquire data of the content including the sound signal;
execute an analysis process on the sound signal; and
generate a vibration stimulation signal to be provided to the user in a conversion process of the sound signal according to a result of the analysis process, wherein
the conversion process includes an emphasis process of a low frequency range in a vibration stimulation signal according to the result of the analysis process, and
the controller is further configured to:
in a case where a level of a predetermined low-frequency range in the sound signal is less than a preliminarily-set threshold, execute the emphasis process.

10. The information processing apparatus according to claim 9, wherein the controller is further configured to:
estimate a sound source by an Artificial Intelligence (AI) inference model that estimates a sound source of the sound signal; and
execute the conversion process corresponding to the estimated sound source.

11. The information processing apparatus according to claim 9, wherein the controller is further configured to:
detect a specific scene from the content; and
execute the conversion process corresponding to the detected specific scene.

12. The information processing apparatus according to claim 9, wherein the controller is further configured to:
execute calibration on the conversion process in accordance with a vibration providing environment.

13. The information processing apparatus according to claim 9, wherein the conversion process includes:
 synthesizing a vibration signal constituted of a signal in a predetermined low frequency range.

14. The information processing apparatus according to claim 13, wherein the controller is further configured to:
 estimate a sound source by an Artificial Intelligence (AI) inference model that estimates a sound source of the sound signal; and
 execute the conversion process corresponding to the estimated sound source.

15. The information processing apparatus according to claim 13, wherein the controller is further configured to:
 detect a specific scene from the content; and
 execute the conversion process corresponding to the detected specific scene.

16. An information processing method for generating a vibration stimulation signal to be provided to a user based on a sound signal in a content, the method comprising:
 generating a vibration stimulation signal to be provided to the user based on a conversion process of the sound signal that is processed in accordance with a result of an analysis process of the sound signal of the content, wherein
 the conversion process includes an emphasis process of a low frequency range in a vibration stimulation signal according to the result of the analysis process, and the emphasis process includes a division process of the sound signal used in the conversion process.

17. The information processing method according to claim 16, wherein the division process includes:
 in accordance with the result of the analysis process, dividing a frequency of the sound signal by a pitch shift.

18. The information processing method according to claim 16, wherein the conversion process includes:
 synthesizing a vibration signal constituted of a signal in a predetermined low frequency range.

19. The information processing method according to claim 16, further comprising:
 in a case where a level of a predetermined low-frequency range in the sound signal is less than a preliminarily-set threshold, executing the emphasis process.

20. The information processing method according to claim 16, further comprising:
 estimating a sound source by an Artificial Intelligence (AI) inference model that estimates a sound source of the sound signal; and
 executing the conversion process corresponding to the estimated sound source.

* * * * *